UNITED STATES PATENT OFFICE.

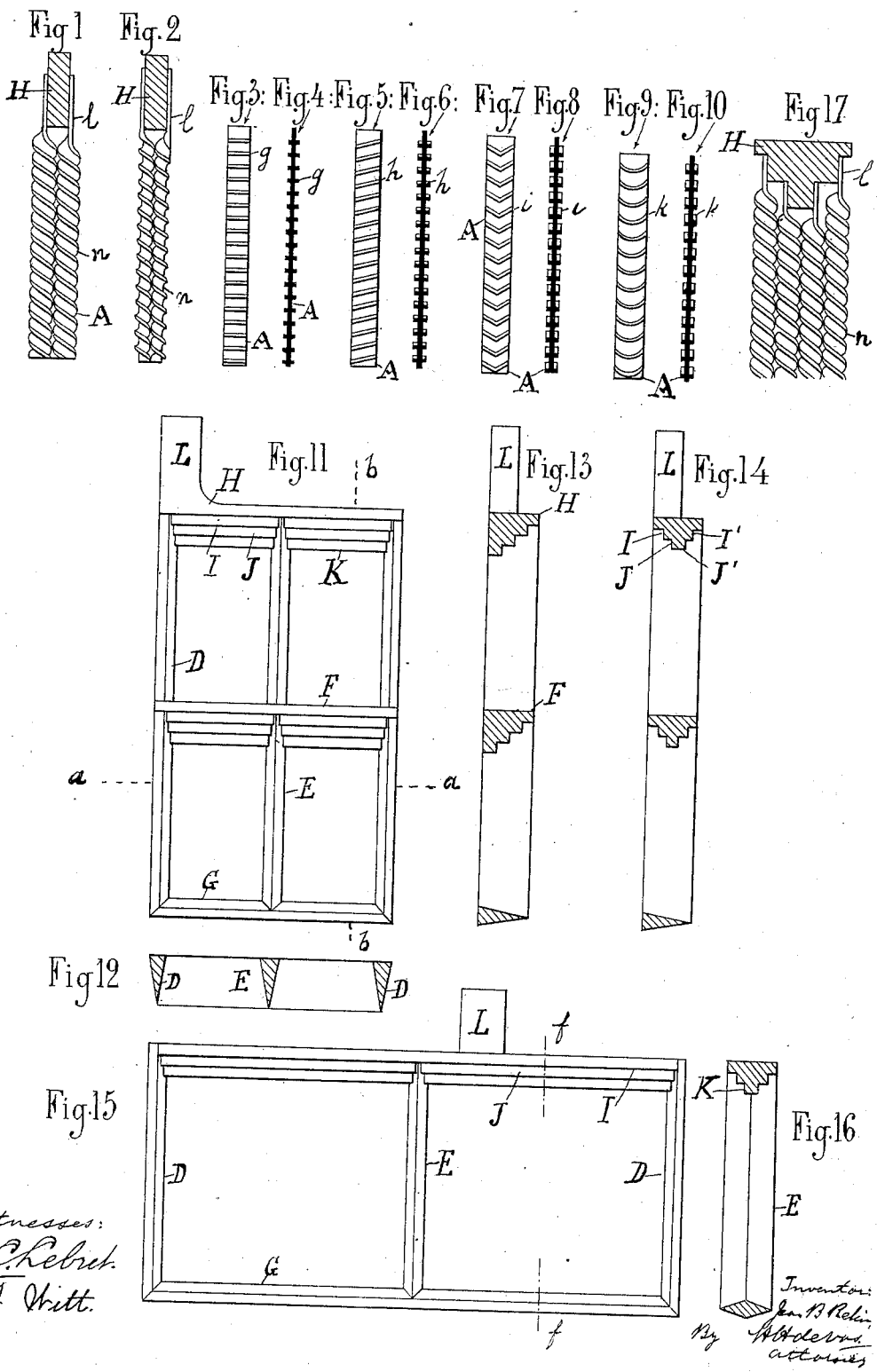

JEAN BAPTISTE RELIN, OF LEVALLOIS-PERRET, FRANCE.

ACCUMULATOR.

SPECIFICATION forming part of Letters Patent No. 711,122, dated October 14, 1902.

Application filed December 4, 1901. Serial No. 84,625. (No model.)

*To all whom it may concern:*

Be it known that I, JEAN BAPTISTE RELIN, a citizen of the Republic of France, residing at No. 2 Rue Fromont, in the city of Levallois-Perret, department of Seine, France, have invented a certain new and useful Improvement in Accumulators and Plates or Elements Therefor and Methods of Forming the Same, of which the following is a specification, such as will enable others skilled in the art to which it appertains to make and use the same.

My invention relates specifically to the form of the elements or plates of accumulators, and while all the parts thereof are usually formed of lead in the first instance I do not limit myself to such substance, as any material suitable to be acted upon by the electrolyte in the manner proper to form an accumulator may be used instead of lead.

The electrodes, plates, or elements of my new accumulator consist of a frame, usually of rectangular form, provided with one or more rectangular recesses formed in and through the same, the bottom and side walls of which recesses are of triangular form in cross-section and having the under side of the top walls thereof provided on one or both sides with a series of steps, to the outer face of which are soldered or otherwise secured a plurality of small plates or narrow strips of such form as to present an extremely large surface to the action of the electrolytic fluid, such strips being usually twisted, flattened, and pitted or indented, so as to be provided with small projections to retain the active material and facilitate the circulation of the electrolyte, the flattening of the strips as well as the pitting being usually done by subjecting the entire plate or element to suitable pressure after the twisted strips have been secured to the supporting-frame.

Said invention is fully shown and described in the following specification, of which the accompanying drawings form a part, wherein similar letters of reference designate like or equivalent parts wherever found throughout the several views, and in which—

Figure 1 shows the strips wound in screw shape connected at the top to a frame to form an element or plate. Fig. 2 illustrates the same strips wherein the exterior coils are flattened, the interior coils remaining the same. Fig. 3 shows a strip with simple horizontal projections. Fig. 4 is a section on the axis of Fig. 3. Fig. 5 shows a strip with V-shaped projections. Fig. 6 is a vertical section of Fig. 5 on the center of the band shown in Fig. 5. Fig. 7 shows a strip with chevron-like projections. Fig. 8 is a vertical section of Fig. 7 on the center of the band shown in Fig. 7. Fig. 9 shows a strip with projections of semicircular shape. Fig. 10 is a vertical section of Fig. 9 on the center of the strip shown in Fig. 9. Fig. 11 shows a front view of one form of frame to which the strips are fixed to form an element or plate. Fig. 12 is a section on the line $a\ a$ of Fig. 11. Fig. 13 is a side view, in vertical section, of a modified form of frame. Fig. 14 is a vertical section of Fig. 11 on line $b\ b$. Fig. 15 shows a front view of a frame adapted for large batteries of slight height. Fig. 16 is a section on line $f f$ of Fig. 15, and Fig. 17 shows a sectional view of the bands fixed on the frame as represented in Figs. 13 and 16.

The electrode of my new accumulator consists of a frame of lead or other suitable material or narrow strips on which are soldered small plates of like material twisted so as to be of the well-known double-spiral form of the common wood-augers having the two spiral indentations or grooves $n$ and then incompletely flattened down, so as to form an indented strip, which is nearly flat, but provided with small projections for retaining the active material and facilitating the circulation of the electrolyte. In order to form these strips A as explained, after the frame has been fully provided with the small twisted strips each row is just covered over with sea-salt or rock-salt or any other substance which is hard, but can easily be dissolved out. The plates or elements having been prepared in this way are put into a press of any kind to flatten the coils, not entirely, but only partly, so as to leave projections on their surface. The object of the salt is not only to preserve the projections on the small strips, but also to form on the surface of the same an immense number of small hollows very suitable for the formation of the active material. Further, the sea-salt has the property of slightly cleaning the surface of the lead, and thus making it more sensible to the action of the electrolyte at the moment of its formation. The little strips A flattened in this way are then put into water for the purpose of dissolving the salt. After dissolving the salt the plates are subjected to the action of an electrolytic bath in order to form the active material or may be filled with active material either before or after pressing.

The necessary projections formed on the plates could obviously be obtained otherwise than by twisting them spirally and flattening them down; but this appears to me the most rational method and the one requiring the least effort and the smallest equipment of tools; but I can also by mechanical means make projections of the shapes shown in Figs. 3 to 10, inclusive—namely, either the little horizontal projections $g$ of Figs. 3 and 4 or the little diagonal projections $h$ shown in Figs. 5 and 6 or small chevron-like projections $i$, as in Figs. 7 and 8, or small semicircular projections $k$, as in Figs. 9 and 10. When of the twisted form shown in Figs. 1, 2, and 17, the little strips A are provided at the upper end with securing portions $l$, by which the same are secured by soldering to the frame-bar H to form plates or elements of suitable size for insertion in the electrolytic bath. These strips A, of whatever form desired, are formed into plates or elements of suitable size, usually of the form shown in Figs. 11 to 17, inclusive, having four rectangular spaces formed by the vertical center bar E of the triangular shape shown in cross-section and the horizontal bar F, but sometimes formed with only two spaces. (Shown in Fig. 15.) In the form shown in Fig. 11 the top bar H and the center horizontal bar F are provided with steps, so as to be of the form shown in cross-section in Fig. 13, one row of the strips A being secured to the step I, another to the step J, and the third to the step K by soldering the projections L of said strips thereto. Sometimes instead of the single form shown in Figs. 11 and 13 steps I and J, as shown in Fig. 14, may be formed upon one side of the top bar H and cross-bar F and like steps I' and J' upon the opposite side of such top and cross bar of the frame, so that the strips A may be arranged as shown in detail in Fig. 17.

The bottom bars G and side bars D, as well as the center bars E, are usually of triangular form in cross-section, as shown in Fig. 12, and the top bar H is provided with the upwardly-extending tang L, by which connection is made with the corresponding element or the electrical conductor.

Such electrodes, plates, or elements, each consisting of a frame and having steps on which are soldered or otherwise firmly secured, twisted, flattened, and pitted strips, are supplied with active material and formed in the usual manner and inserted in a trough filled with any suitable electrolyte and coupled up in the way well known in the art, thus forming an electric accumulator-battery of high efficiency and long life.

What I claim, and desire to secure by Letters Patent, is—

1. A frame adapted to form the supporting portion of an accumulator element or plate having the side and bottom walls of triangular form in cross-section and the upper portion provided with a series of steps adapted to receive the ends of downwardly-depending strips, substantially as shown and described.

2. A frame adapted to form the supporting portion of an accumulator element or plate having the side and bottom walls of triangular form in cross-section and the upper portion provided on either side with a series of steps adapted to receive the ends of downwardly-depending strips, substantially as shown and described.

3. A frame adapted to form the supporting portion of an accumulator element or plate having a plurality of rectangular orifices formed in and through the same, each of which orifices is provided at one end with a step portion extending across the same adapted to receive the ends of suitable strips, substantially as shown and described.

4. An accumulator-plate comprising a rectangular frame having a recess or recesses provided at one end with a plurality of steps to which are secured the end of a plurality of twisted strips, substantially as shown and described.

5. An accumulator-plate comprising a rectangular frame having a recess or recesses provided at one end with a plurality of steps to which are secured the end of a plurality of twisted, flattened and pitted strips, substantially as shown and described.

Signed at Paris, in the Republic of France, this 13th day of November, A. D. 1901.

JEAN BAPTISTE RELIN.

Witnesses:
CHARLES MERVILLE,
B. MERVILLE,
PAUL CHAPPÉ.